United States Patent

[11] 3,609,142

[72] Inventor John R. Norell
            Bartlesville, Okla.
[21] Appl. No. 586,659
[22] Filed Oct. 14, 1966
[45] Patented Sept. 28, 1971
[73] Assignee Phillips Petroleum Company

[54] BECKMANN REARRANGEMENT OF CYCLIC KETOXIMES TO LACTAMS
10 Claims, No Drawings

[52] U.S. Cl. .................................................. 260/239.3,
    260/326.5 FN, 260/244.7 F, 260/558 R, 260/561 R, 260/562 R
[51] Int. Cl. ............................................... C07d 41/06
[50] Field of Search ................................ 260/239.3, 294.7 F, 326.5 F

[56] References Cited
UNITED STATES PATENTS

| | | | |
|---|---|---|---|
| 3,389,134 | 6/1968 | Garritsen et al. | 260/239.3 |
| 3,437,655 | 4/1969 | Garritsen et al. | 260/239.3 |
| 2,234,566 | 3/1941 | Lazier et al. | 260/239.3 |
| 2,313,026 | 3/1943 | Schlack | 260/239.3 |
| 2,423,200 | 7/1947 | Moncrieff et al. | 260/239.3 |
| 2,721,199 | 10/1955 | Huber | 260/239.3 |
| 3,016,375 | 1/1962 | Hopkins et al. | 260/239.3 |

OTHER REFERENCES

Chapman " J. Chem. Soc." (1935) pages 1223- 9 (1935)
Chemical Abstracts Vol. 52 Col. 2894 (1958) (Abstracting Czech Patent 85,971, Oct. 15, 1956 to Milos Hudlicky)
Ingold " Structure and Mechanism in Organic Chemistry" pp 496- 7 (1953) (Cornell)
Gould Structure and Mechanism in Organic Chemistry pp. 618- 21 (1959) (Holt-Dryden)

*Primary Examiner*—John D. Randolph
*Assistant Examiner*—Robert T. Bond
*Attorney*—Young and Quigg

ABSTRACT: Amides are produced from ketoximes by Beckmann rearrangement in hydrogen fluoride medium at temperature between 0° to 75° C using a carboxylic acid or anhydride catalyst.

BECKMANN REARRANGEMENT OF CYCLIC KETOXIMES TO LACTAMS

This invention relates to amides. In one aspect it relates to the production of an amide from a ketoxime by a Beckmann rearrangement.

It is well known that ketoximes in strongly acidic substances such as sulfuric acid, oleum, chlorosulfonic acid, phosphorus pentachloride, and the like rearrange to amides by a Beckmann rearrangement process. One difficulty which has been encountered is that such strongly acidic substances cause the Beckmann rearrangement to proceed very rapidly and the reactions are difficult to control. Furthermore, the rearrangement is accompanied by side reactions leading to undesirable products. To circumvent these problems, hydrogen fluoride has been employed for the rearrangement of cyclohexanone oxime to caprolactam at elevated temperatures and pressures. However, such method suffers the disadvantage of requiring costly equipment and the disadvantage of operating at elevated temperatures and pressures.

An object of my invention is to produce an amide by a Beckmann rearrangement from a ketoxime.

Another object of my invention is to produce an amide using hydrogen fluoride, or hydrofluoric acid, as a medium.

Other aspects, objects, and advantages of the invention will be apparent to one skilled in the art from a study of the specification and the appended claims.

According to the invention, the rearrangement of ketoximes to amides in a medium comprising hydrogen fluoride by a Beckmann rearrangement is facilitated by incorporating a reaction-promoting catalyst into the medium. According to my invention, reaction-promoting catalysts are selected from the group consisting of aliphatic carboxylic acids, aliphatic halogenated carboxylic acids, aliphatic carboxylic acid anhydrides, and aliphatic carboxylic acid halides.

Although the process of the invention is applicable to any ketoxime capable of undergoing a Beckmann rearrangement, it is particularly applicable in the rearrangement of ketoximes having three to about 25 carbon atoms. Oximes of both acyclic and cyclic ketones can be used to produce amides according to the present invention. Examples of applicable ketoximes which are useful in practicing the present invention include the oximes of ketones such as acetone, diethyl ketone, methyl butyl ketone, methyl isobutyl ketone, dihexyl ketone, didodecyl ketone, acetophenone, benzophenone, ethyl p-tolyl netone, dicyclohexyl ketoner, methyl cyclopentyl ketoner, cyclohexanone, 2-methycyclopentanone, cyclododecanone, and the like.

The reaction-promoting catalysts generally will not have more than six carbon atoms per molecule. The reaction-promoting catalyst serves the important function of permitting the use of lower operating temperatures and pressures, thus greatly reducing equipment cost, particularly in view of the corrosive characteristics of hydrogen fluoride at increased temperatures. Examples of applicable reaction-promoting catalysts are acetic acid, propionic acid, normal butyric acid, isobutyric acid, hexanoic acid, chloroacetic acid, dichloroacetic acid, trichloroacetic acid, bromoacetic acid, 3-iodopropionic acid, 5-fluorohexanoic acid, acetic anhydride, propionic anhydride, acetyl chloride, propionyl bromide, butryl iodide, hexanoyl fluoride, and the like. The preferred reaction-promoting catalysts are aliphatic carboxylic acid anhydrides, such as acetic anhydride, and aliphatic carboxylic acid chlorides, such as acetyl chloride.

In the process of the invention the ratio of the reaction-promoting catalyst to ketoxime is in the range of 0.5 to 20 moles of reaction promoting catalyst per mole of ketoxime. It has been found that it is suitable to carry out the reaction where the reaction-promoting catalyst and the ketoxime are present in a 1:1 mole ratio. When larger amounts of the reaction-promoting catalyst, such as 20 moles per 1 mole of the ketoxime, are present, the excess amount of the reaction-promoting catalyst serves as a diluent or solvent for the reaction mixture. If desired, other diluents such as sulfur dioxide, water, or an ether can be present. It is desirable that the hydrogen fluoride be present in a ratio within the range of about 5 to 50 moles of hydrogen fluoride per mole of ketoxime. Although the temperature range can vary considerably, the reaction operates satisfactorily within the range of about 0° to 75° C. and a particularly suitable temperature range is 20° to 60° C. The reaction time will vary, depending in part upon the reaction temperature and the nature of the reaction-promoting substance. The reaction time can vary over a wide range, e.g., from within about 5 minutes to about 24 hours, but the preferred reaction time range is about 30 minutes to about 6 hours. Contrary to prior methods, high pressures are not needed to conduct the reaction. Only sufficient pressure is needed on the mixture to maintain the components of the mixture in a substantially liquid phase.

When the desired amount of completion of the reaction has taken place, the reaction mixture can be neutralized with a base, with or without prior recovery of free hydrogen fluoride, or hydrogen fluoride and the reaction-promoting catalyst can be separated by distillation or other suitable means. The product amides in the neutralized mixture can then be separated and purified by conventional procedures such as extraction, distillation, crystallization, and the like. When the free hydrogen fluoride and reaction-promoting catalyst are separated from the mixture, they can be recycled to the reactor to further assist in carrying out the reaction. When the ketone corresponding to the ketoxime is produced as a byproduct, it can be readily separated by conventional methods such as extraction, distillation, and the like, and converted back to the ketoxime, which can then be returned to the reactor, together with any recovered unreacted ketoxime.

The following examples serve to illustrate how the present invention may be carried out in practice, but the invention is not restricted to these examples.

EXAMPLE I

To 40 ml. (2.0 moles) of anhydrous hydrogen fluoride in a 300-ml. Monel reactor cooled in an ice bath was added 10.2 g. (0.10 mole) of acetic anhydride. Cyclohexanone oxime (11.3 g., 0.10 mole) was then added, after which the reactor was closed and shaken at room temperature (29°–33° C.) for 2 hours. The reaction mixture was poured into an ice water mixture and then neutralized with sodium carbonate. The mixture was extracted with three 150-ml. portions of chloroform, and the combined extracts were dried over magnesium sulfate. Substantial removal of solvent gave a residue weighing 19.1 g. Gas chromatographic analysis of this residue through use of a 9-ft. Apiezon L-column showed that after exclusion of the residual chloroform the residue contained 72 weight percent caprolactam, 28 weight percent cyclohexanone, and only a trace of cyclohexanone oxime.

EXAMPLE II

An experiment was carried out by the procedure described in Example I except that the reaction temperature was 60° C. instead of 29°–33° C. Gas chromatographic analysis of the residue (14.7 g.) obtained upon substantial removal of chloroform showed that this residue, after exclusion of residual chloroform, contained 92.6 weight percent caprolactam and 7.4 weight percent cyclohexanone, with no evidence of any cyclohexanone oxime.

EXAMPLE III

To illustrate the importance of acetic anhydride in the process, an experiment was carried out by the procedure used in Example II except that no acetic anhydride was used. Gas chromatographic analysis of the residue (12.7 g.) obtained upon substantial removal of chloroform showed that this residue, after exclusion of residual chloroform, contained less than 5 weight percent caprolactam and more than 95 weight percent cyclohexanone oxime, with no evidence of any cyclohexanone.

In a similar experiment carried out in the absence of acetic anhydride, except that the reaction was carried out at 40° C. instead of 60° C., gas chromatographic analysis of the residue (13.6 g.) obtained upon substantial removal of chloroform showed that this residue, after exclusion of residual chloroform, was nearly 100 percent cyclohexanone oxime, with only a trace of caprolactam and no cyclohexanone being detected.

Thus, the rearrangement of cyclohexanone oxime to caprolactam in the absence of acetic anhydride takes place far more slowly than does the rearrangement in the presence of acetic anhydride, as in Examples I and II, under otherwise comparable conditions.

EXAMPLE IV

A mixture of 19.7 g. (0.10 mole) of cyclododecanone oxime, 60 ml. (3.0 moles) of anhydrous hydrogen fluoride, and 9.0 g. (0.09 mole) of acetic anhydride in a closed 300-ml. Monel reactor was shaken at 60° C. for 2 hours. The reaction mixture was poured into an ice water mixture and then neutralized with concentrated ammonium hydroxide. The mixture was extracted with methylene chloride, and the extract was dried over magnesium sulfate. Removal of solvent from the dried extract gave as a residue 18.8 g. (95.5 percent yield) of omega-dodecanolactam melting at 149°–150° C., identified by mixed melting point with an authentic specimen. The identification was confirmed by comparison of the produced lactam with an authentic specimen by gas chromatography and by infrared spectroscopy.

EXAMPLE V

Cyclohexanone oxime (22.6 g., 0.20 mole) was dissolved in a mixture of 75 ml. of acetic acid and 75 ml. of anhydrous, liquid hydrogen fluoride in a polyethylene reaction vessel. The mixture was stirred at room temperature for 6 hours, after which it was allowed to stand overnight, resulting in the rearrangement of a portion of the cyclohexanone oxime to caprolactam. The reaction mixture was then poured into 500 ml. of an ice water mixture, and approximately 350 ml. of concentrated ammonium hydroxide was added to neutralize the resulting mixture. The mixture was then extracted with three 200-ml. portions of diethyl ether, and the combined ether extracts were dried over magnesium sulfate. Removal of the ether gave as a residue 20.3 g. of a light brown solid. Gas chromatographic analysis of a chloroform solution of this solid indicated that no caprolactam was present, and that the solid was essentially pure cyclohexanone oxime, thus representing a recovery of 90 percent of the cyclohexanone oxime employed. The aqueous solution remaining from the ether extraction was then extracted with three 200-ml. portions of chloroform. The combined chloroform extracts were dried over magnesium sulfate, and solvent was removed, giving as a residue 2.6 g. of a tan liquid which was shown by gas chromatographic analysis to contain only caprolactam, a small amount of residual chloroform, and a trace of cyclohexanone oxime.

Once the reaction as set forth in the above examples is carried out, the produced amide, such as caprolactam, can be separated from the ketoxime, such as cyclohexanone oxime, and side reaction products, such as cyclohexanone, by suitable recovery methods which are known in the art. However, a particularly useful method for separating the produced amide from the ketoxime and side reaction products is set forth in my copending application entitled "Separation of Lactams and Cycloalkanone Oximes," Ser. No. 586,616, filed Oct. 14, 1966, now U.S. Pat. No. 3,484,434.

The amides produced in accordance with the present invention can be used as monomers in the production of polyamides, such as nylon, and as solvents.

I claim:

1. A process for the production of a lactam from an oxime of cyclic ketones capable of undergoing a Beckmann rearrangement which comprises admixing said oxime in a liquid medium comprising hydrogen fluoride and a reaction-promoting catalyst selected from the group consisting of an aliphatic carboxylic acid, an aliphatic halogenated carboxylic acid, an aliphatic carboxylic acid anhydride, and an aliphatic carboxylic acid halide at a temperature within the range of about 0° to 75° C.

2. A process according to claim 1 for the production of a lactam from an oxime by a Beckmann rearrangement which comprises:
   a. cooling anhydrous hydrogen fluoride in a reaction vessel;
   b. admixing acetic anhydride and cyclohexaone oxime with said cooled anhydrous hydrogen fluoride to form a mixture therewith;
   c. agitating said mixture at about 29°–33° C.;
   d. diluting said mixture with water;
   e. neutralizing said diluted mixture with a base;
   f. extracting said diluted mixture with a plurality of portions of a chlorinated hydrocarbon and combining the chlorinated hydrocarbon extracts;
   g. drying said chlorinated hydrocarbon extracts; and
   h. removing said chlorinated hydrocarbon to produce a residue containing caprolactam.

3. A process according to claim 1 for the production of a lactam from an oxime by a Beckmann rearrangement which comprises:
   a. admixing cyclododecanone oxime, anhydrous hydrogen fluoride and acetic anhydride in a reaction vessel to form a mixture;
   b. agitating said mixture about 60° C.;
   c. diluting said mixture with water;
   d. neutralizing said diluted mixture with a base;
   e. extracting said diluted mixture with a plurality of portions of a chlorinated hydrocarbon and combining the chlorinated hydrocarbon extracts;
   f. drying said chlorinated hydrocarbon extract; and
   g. removing said chlorinated hydrocarbon to produce a residue containing omega-dodecanolactam.

4. A process according to claim 1 wherein said oxime has three to about 25 carbon atoms.

5. A process according to claim 9 wherein said ketoxime is an oxime of a cyclic ketone.

6. A process according to claim 4 wherein said hydrogen fluoride and said oxime are present in the range of about 5 to 50 moles of hydrogen fluoride per mole of ketoxime.

7. A process according to claim 4 wherein said reaction-promoting catalyst and said oxime are present in the range of about 0.5 to 20 moles of reaction-promoting catalyst per mole of ketoxime.

8. A process according to claim 7 wherein said reaction-promoting catalyst and said oxime are present in a 1:1 mole ratio with respect to each other.

9. A process according to claim 4 wherein said oxime and said liquid medium are maintained at a temperature within the range of about 0° to 75° C. for a period of time within the range of about 5 minutes to about 24 hours.

10. A process according to claim 9 wherein said oxime and said liquid medium are maintained at a temperature within the range of about 20° to 60° C. for a period of time within the range of about 30 minutes to about 6 hours.

UNITED STATES PATENT OFFICE    16689 LEC

CERTIFICATE OF CORRECTION

Patent No. 3,609,142　　　　John R. Norell　　　　Dated Sept. 28, 1971

It is certified that error appears in the above-identified patent and that said Letters Patent are hereby corrected as shown below:

> The claim appearing in the printed patent as claim 5 was canceled during prosecution.

Signed and sealed this 10th day of October 1972.

(SEAL)
Attest:

EDWARD M. FLETCHER, JR.　　　　　　　　ROBERT GOTTSCHALK
Attesting Officer　　　　　　　　　　　　Commissioner of Patents